June 3, 1930.  A. M. BABITCH  1,761,962
LAMINATED WORM GEAR
Filed March 28, 1927
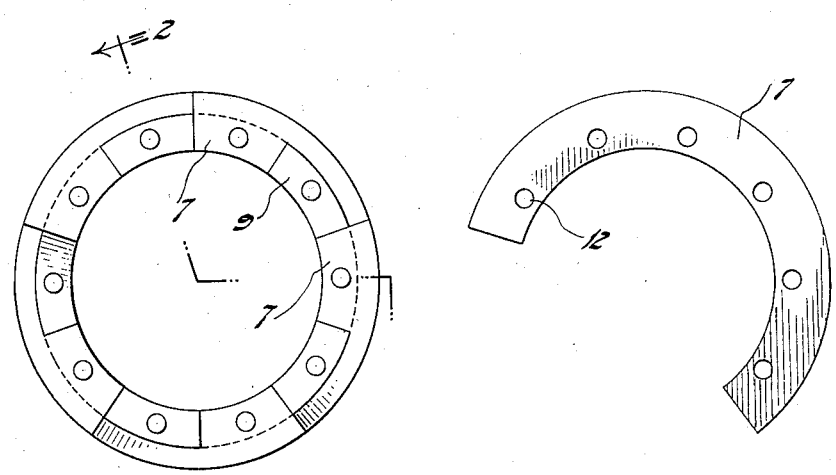
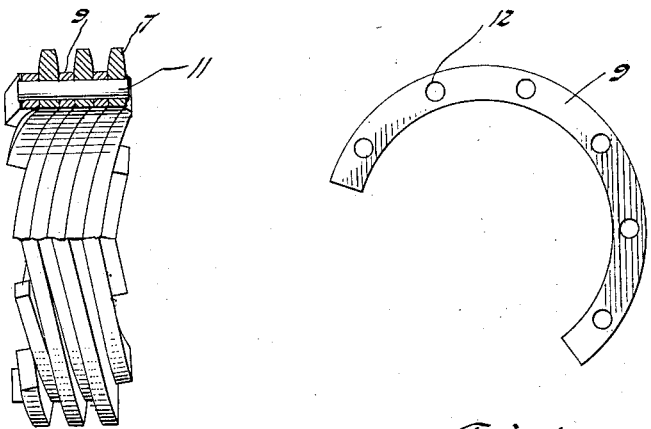
Inventor
Abraham M. Babitch
By Blackmore, Spencer & Hide
Attorneys Patented June 3, 1930

1,761,962

UNITED STATES PATENT OFFICE

ABRAHAM M. BABITCH, OF FLINT, MICHIGAN, ASSIGNOR TO A C SPARK PLUG COMPANY, OF FLINT, MICHIGAN, A COMPANY OF MICHIGAN

LAMINATED WORM GEAR

Application filed March 28, 1927. Serial No. 179,017.

This invention relates to gearing and more specifically to a novel worm gear structure.

An object is to make a gear, and especially a worm gear, more economically than has been possible heretofore.

Another object is to make a gear of stamped parts which are assembled and secured together thereby avoiding all gear cutting.

Other objects and advantages will be understood from a reading of the following specification and an examination of the accompanying drawing.

Figure 1 is a view in elevation of a worm gear of my construction.

Figure 2 is a sectional view substantially on the line 2—2 of Fig. 1.

Figure 3 is an elevation of one of the gear elements.

Figure 4 is a similar view of one of the spacers.

Referring by reference characters to the drawing, numeral 7 shows one of a series of circular ring sectors formed by stamping. These elements may be cut from flat stock and shaped spirally as shown by Figure 2. Numeral 9 represents a similar circular ring sector having lesser radial dimensions but similar circumferential extent.

The several ring sectors are assembled alternately with rings 9, equal circumferential spacing being made as shown in Figure 1 until a complete ring gear is formed. Rivets 11 are used extending through openings 12 in the rings 7 and spacers 9 to secure the parts 7 and 9 together. Inasmuch as the inner periphery of the rings 7 and 9 are in alignment the outer periphery of rings 9 project beyond spacer 7 to form gear teeth. The depth of the gear teeth is dependent upon the difference in radial extent of the members 7 and 9 as will be apparent from an inspection of Figure 2. As will be seen to be necessary the openings for the rivets are displaced inwardly from the center of the ring 7 in order to register with the openings in ring 9.

It will be noted that at either side of the gear thus formed the ends of the member 7 and 9 lie in a plane surface, and that the extent of angularity to those parallel plane surfaces of the spaced teeth determines the length of the ring sectors and spacers and also the circumferential spacing between adjacent ends of gear elements and spacers.

A gear made up in this way possesses the requisite strength and may be easily, quickly and economically manufactured.

I claim:

1. A gear comprising a series of stamped ring sector tooth members of spiral shape and a second series of similarly shaped spacing members of less radial extent, the members of the two series being assembled in concentric and alternating relation to form a spiral gear.

2. A multiple-tooth spiral gear comprising series of stamped ring sector tooth members of spiral shape and alternating series of similarly shaped spacing members of less radial extent, the members of the series being assembled in concentric relation.

In testimony whereof I affix my signature.

ABRAHAM M. BABITCH.